United States Patent
Wagle et al.

(10) Patent No.: US 11,203,710 B2
(45) Date of Patent: *Dec. 21, 2021

(54) METHOD AND MATERIALS TO CONVERT A DRILLING MUD INTO A SOLID GEL BASED LOST CIRCULATION MATERIAL

(71) Applicant: Saudi Arabian Oil Company, Dhahran (SA)

(72) Inventors: Vikrant Wagle, Abqaiq (SA); Rajendra Arunkumar Kalgaonkar, Abqaiq (SA); Abdullah Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,721

(22) Filed: May 4, 2020

(65) Prior Publication Data

US 2020/0270503 A1 Aug. 27, 2020

Related U.S. Application Data

(63) Continuation-in-part of application No. 16/281,535, filed on Feb. 21, 2019, now Pat. No. 10,655,049.

(51) Int. Cl.
| | | |
|---|---|---|
| *C09K 8/16* | (2006.01) | |
| *C09K 8/24* | (2006.01) | |
| *E21B 43/22* | (2006.01) | |
| *E21B 33/138* | (2006.01) | |

(52) U.S. Cl.
CPC .................. *C09K 8/16* (2013.01); *C09K 8/24* (2013.01); *C09K 2208/10* (2013.01)

(58) Field of Classification Search
CPC ... C04B 24/383; C04B 28/02; C09K 2208/26; C09K 8/685; C09K 8/035; C09K 8/64; C09K 8/80; C09K 8/68; C09K 8/90; C09K 2208/10; C09K 8/805; C09K 8/82; E21B 43/267; E21B 43/26; E21B 43/25; E21B 43/16; E21B 43/04; E21B 33/138; E21B 33/14

See application file for complete search history.

(56) References Cited

U.S. PATENT DOCUMENTS

| | | |
|---|---|---|
| 3,371,712 A | 3/1968 | Adams |
| 4,732,213 A | 3/1988 | Bennett et al. |
| 4,799,549 A | 1/1989 | Vinot et al. |
| 5,320,171 A | 6/1994 | Laramay |
| 7,013,973 B2 | 3/2006 | Danican et al. |
| 7,413,013 B2 | 8/2008 | Welton et al. |
| 7,458,424 B2 | 12/2008 | Odeh et al. |
| 7,926,567 B2 | 4/2011 | Harris et al. |
| 7,934,557 B2 | 5/2011 | Nguyen |
| 7,954,549 B2 | 6/2011 | Lende et al. |
| 9,045,965 B2 | 6/2015 | Patil et al. |
| 9,133,386 B2 | 9/2015 | Kumar et al. |
| 9,388,335 B2 | 7/2016 | Loiseau et al. |
| 2005/0252659 A1 | 11/2005 | Sullivan et al. |
| 2010/0016183 A1 | 1/2010 | Roddy et al. |
| 2011/0094746 A1 | 4/2011 | Allison et al. |
| 2013/0292120 A1 | 11/2013 | Patil et al. |
| 2014/0158354 A1 | 6/2014 | Kumar et al. |
| 2014/0162910 A1 | 6/2014 | Braley et al. |
| 2014/0174739 A1 | 6/2014 | Bourcier et al. |
| 2014/0353043 A1 | 12/2014 | Amanullah et al. |
| 2015/0126415 A1 | 5/2015 | Husein et al. |
| 2015/0344772 A1 | 12/2015 | Droger et al. |
| 2016/0107938 A1 | 4/2016 | Mader et al. |
| 2016/0122618 A1 | 5/2016 | Nguyen et al. |
| 2016/0122625 A1 | 5/2016 | Singh et al. |
| 2016/0319185 A1 | 11/2016 | Semenov et al. |
| 2016/0319188 A1 | 11/2016 | Loiseau et al. |
| 2016/0347986 A1 | 12/2016 | Nguyen et al. |
| 2018/0320053 A1 | 11/2018 | Kalgaonkar et al. |
| 2019/0055456 A1 | 2/2019 | Wagle et al. |
| 2019/0161668 A1 | 5/2019 | Wagle et al. |
| 2019/0276724 A1 | 9/2019 | Wagle et al. |

FOREIGN PATENT DOCUMENTS

| | | |
|---|---|---|
| CN | 105907380 A | 8/2016 |
| CN | 110959035 A | 4/2020 |
| GB | 2170838 A | 8/1986 |

(Continued)

OTHER PUBLICATIONS

Office Action dated Aug. 7, 2019 pertaining to U.S. Appl. No. 16/281,503, filed Feb. 21, 2019, 14 pgs.

(Continued)

*Primary Examiner* — Zakiya W Bates
(74) *Attorney, Agent, or Firm* — Dinsmore & Shohl LLP

(57) ABSTRACT

A method for controlling loss circulation in a subterranean formation and a convertible drilling mud operable to convert into a solid gel lost circulation material. The method includes circulating in a wellbore a nanosilica drilling fluid having a pH in a range of from about 8 to about 11 and a gel pH of less than 8, where the nanosilica drilling fluid includes an aqueous-based drilling mud, an alkaline nanosilica dispersion, and at least one additive. The method also includes introducing into the nanosilica drilling fluid an amount of a chemical activator sufficient to produce a convertible drilling mud where the chemical activator is an acid and the pH of the convertible drilling mud is less than the gel pH. The method also includes allowing the convertible drilling mud to convert into a solid gel lost circulation material.

21 Claims, 1 Drawing Sheet

(56) References Cited

FOREIGN PATENT DOCUMENTS

| WO | 2015041703 A1 | 3/2015 |
| WO | 2015116044 A1 | 8/2015 |
| WO | 2019104301 A1 | 5/2019 |

OTHER PUBLICATIONS

Office Action dated Aug. 7, 2019 pertaining to U.S. Appl. No. 16/281,535, filed Feb. 21, 2019, 14 pgs.
Kang et al. "Strengthening shale wellbore with silica nanoparticles drilling fluid" Petroleum, Jun. 1, 2016, pp. 189-195, vol. 2, No. 2.
Ghanbari et al. "A facile method for synthesis and dispersion of silica nanoparticles in water-based drilling fluid" Colloid & Polymer Science, Oct. 31, 2015, pp. 381-388, vol. 294, No. 2.
International Search Report and Written Opinion dated Nov. 4, 2019 pertaining to International application No. PCT/US2019/040966 filed Jul. 9, 2019, 19 pgs.
International Search Report and Written Opinion dated Jan. 21, 2020 pertaining to International application No. PCT/US2019/057125 filed Oct. 21, 2019, 15 pgs.
GCC Office Action dated Oct. 21, 2020 pertaining to GCC Patent Application No. 2019/38046, filed Aug. 4, 2019, 5 pages.
Office Action dated Sep. 29, 2020 pertaining to U.S. Appl. No. 16/865,719, filed May 4, 2020, 19 pgs.
International Search Report and Written Opinion dated Mar. 9, 2021 pertaining to International application No. PCT/US2020/061182 filed Nov. 19, 2020, 12 pgs.
International Search Report and Written Opinion dated Jun. 18, 2021 pertaining to International application No. PCT/US2021/020851 filed Mar. 4, 2021, 15 pages.

METHOD AND MATERIALS TO CONVERT A DRILLING MUD INTO A SOLID GEL BASED LOST CIRCULATION MATERIAL

CROSS-REFERENCE TO RELATED APPLICATIONS

This application is a continuation-in-part of U.S. Non-Provisional application Ser. No. 16/281,535, filed Feb. 21, 2019, which is incorporated by reference herein in its entirety.

BACKGROUND

Field

Embodiments of the present disclosure generally relate to compositions and methods for lost circulation control in a subterranean formation.

Technical Background

Fluids used in drilling a wellbore can be lost to the subterranean formation while circulating in the wellbore. The drilling fluid can enter the subterranean formation via depleted zones, zones of relatively low pressure, lost circulation zones having naturally occurring fractures, weak zones having fracture gradients exceeded by the hydrostatic pressure of the drilling fluid, and other openings between the wellbore and the subterranean formation. The extent of fluid loss to the subterranean formation can be greater than 100 barrels per hour (bbl/hr). As a result, the drilling service provided by such fluid is more difficult or costly to achieve.

Current loss prevention methods require drilling to be temporarily halted so the drilling fluid can be replaced with a lost circulation pill. Periods of halted drilling directly result in non-productive time and lost revenue.

SUMMARY

There is a continual need for generation of an effective lost circulation gel without requiring halting or termination of drilling operations to replace the drilling fluid with a lost circulation pill. Disclosed are compositions and methods for lost control in a subterranean formation and specifically compositions and methods for producing a lost circulation material in situ without halting drilling operations for drilling fluid replacement.

According to one embodiments, a method for controlling lost circulation in a subterranean formation is provided. The method includes circulating in a wellbore a nanosilica drilling fluid having a pH in a range of from about 8 to about 11 and a gel pH of less than 8. Further, the nanosilica drilling fluid includes an aqueous-based drilling mud, an alkaline nanosilica dispersion, and at least one additive. The method also includes introducing into the nanosilica drilling fluid an amount of a chemical activator sufficient to produce a convertible drilling mud where the chemical activator is an acid and the pH of the convertible drilling mud is less than the gel pH. The method also includes allowing the convertible drilling mud to convert into the solid gel lost circulation material. According to at least one embodiment, the additive comprises alkali metal silicate or alkaline earth metal silicate. According to at least one further embodiment, the additive comprises urea-formaldehyde resin.

According to another embodiment, a convertible drilling mud operable to convert into a solid gel lost circulation material is provided. The convertible drilling mud includes a nanosilica drilling fluid and a chemical activator. The nanosilica drilling fluid includes an aqueous based drilling mud, an alkaline nanosilica dispersion, and at least one additive. The nanosilica drilling fluid has a pH and a gel pH, and the pH of the nanosilica drilling fluid is greater than the gel pH. The chemical activator has a pH less than 7 and includes an acid that is operable to react with the nanosilica drilling fluid such that the solid gel lost circulation material forms. Further, the volume ratio of the chemical activator to the alkaline nanosilica dispersion is between 1:1000 and 1:10 before conversion of the convertible drilling mud into the solid gel lost circulation material. According to at least one embodiment, the additive comprises alkali metal silicate or alkaline earth metal silicate. According to at least one further embodiment, the additive comprises urea-formaldehyde resin.

Additional features and advantages of the embodiments described will be set forth in the detailed description which follows, and in part will be readily apparent to those skilled in the art from that description or recognized by practicing the embodiments described, including the detailed description which subsequently follows, and the claims.

BRIEF DESCRIPTION OF THE DRAWINGS

FIG. 1 is a photograph of the solid gel lost circulation material.

DEFINITIONS

In this disclosure, the term "lost circulation zone" refers to an area encountered during drilling operations where the volume of drilling fluid returning to the surface is less than the volume of drilling fluid introduced to the wellbore. The lost circulation zone can be due to any kind of opening between the wellbore and the subterranean formation. Lost circulation zones that can be addressed by convertible drilling mud described here can range from seepage loss to complete fluid loss.

In this disclosure, the term "gel pH" refers to the pH at which the solid gel lost circulation material forms.

In this disclosure, the term "gel time" or "rate of gel formation" refers to the time it takes to form the solid gel lost circulation material from the convertible drilling mud measured as the period from when the gel pH is achieved until the solid gel lost circulation material forms.

In this disclosure, the term "stable" refers to the state where the nanosilica particles are dispersed throughout the alkaline nanosilica dispersion and are not aggregated. Upon destabilization the nanosilica particles aggregate to form a gelled solid.

DETAILED DESCRIPTION

The present disclosure provides a method for controlling lost circulation in a subterranean formation. A well may be drilled with a convertible drilling mud allowing for continued drilling upon encountering a lost circulation zone by converting the in-use convertible drilling mud directly to a treatment fluid for curing the lost circulation. Specifically, the convertible drilling mud of the present disclosure includes an alkaline nanosilica dispersion, which may be converted to a solid gel upon a pH reduction. The solid gel formed in the lost circulation zone may then serve to prevent further fluid loss at the lost circulation zone by acting as a physical barrier.

The convertible drilling mud includes a nanosilica drilling fluid and a chemical activator. The nanosilica drilling fluid includes an aqueous based drilling mud, an alkaline nanosilica dispersion, and at least one additive. The chemical activator is an organic or mineral acid such that exposure of the nanosilica drilling fluid to the chemical activator results in the nanosilica drilling fluid becoming destabilized and to form a gelled solid. Advantageously, the convertible drilling mud can be used at elevated temperatures, such as those experienced in a wellbore and a subterranean formation.

The aqueous based drilling mud may be a water-containing fluid capable of use in a well drilling operation. The at least one additive of the aqueous based drilling mud can include drilling fluid additives commonly used in drilling fluids. The drilling fluid additives can include viscosifiers, pH control agents, weighting agents, filtration control additives, and combinations of the same.

The alkaline nanosilica dispersion represents a dispersion of nanosilica particles in a dispersion fluid in combination with an alkali, such as NaOH, to stabilize the dispersion. It will be appreciated that salts such as NaCl and KCl may be avoided in the alkaline nanosilica dispersion. The surface charge of the nanosilica particles may be neutralized by soluble salts that ionize and reduce the size of a double layer around the silica surface, which allows for aggregation. As such, maintenance of a minimized salt concentration is sought to ensure retention of the dispersion.

In one or more embodiments, the nanosilica particles in the alkaline nanosilica dispersion may have a particle size between 5 nanometers (nm) and 100 nm. In various further embodiments, the nanosilica particles in the alkaline nanosilica dispersion may have a particle size of between 5 nm and 80 nm, between 20 nm and 80 nm, between 30 nm and 60 nm, or between 40 nm and 50 nm. It will be appreciated that a smaller particle size results in a relatively faster gelling when all other parameters are held constant.

The nanosilica particles may have a greater surface area than silica particles as a result of the smaller particle size. Without being bound to a particular theory, the greater surface area of the nanosilica particles can affect the rate of gelation and the nature of the gels formed. More specifically, the smaller particle size of the nanosilica particles in the alkaline nanosilica dispersion promotes faster gelling than silica particles.

The concentration of the nanosilica particles in the alkaline nanosilica dispersion may range between 5 percent by weight (wt %) and 50 wt %. In one or more embodiments, the alkaline nanosilica dispersion may comprise 10 wt % to 50 wt % nanosilica particles, 20 wt % to 50 wt % nanosilica particles, 30 wt % to 50 wt % nanosilica particles, or 40 wt % to 50 wt % nanosilica particles. In one or more specific embodiments, the alkaline nanosilica dispersion may comprise 43 wt % to 47 wt % nanosilica particles. The concentration of nanosilica in the alkaline nanosilica dispersion may impact the rate of gel formation with a greater concentration of nanosilica in the alkaline nanosilica dispersion correlating to a faster rate of gel formation. The amount of the alkaline nanosilica dispersion added to the aqueous based drilling mud may depend on the mud weight of the aqueous based drilling mud. It will be appreciated that an increase in the mud weight may necessitate a commensurate increase in nanosilica dispersion.

The chemical activator is an organic or mineral acid. Examples of organic acids suitable to be the chemical activator include lactic acid, citric acid, maleic acid, formic acid, and acetic acid. Examples of mineral acids suitable to be the chemical activator include hydrochloric acid, sulfuric acid, nitric acid, and phosphoric acid. In one or more specific embodiments, the chemical activator is citric acid. The chemical activator may be in the form of powder, beads, aqueous suspension, fibers, and combinations of the same.

The provided acid in the form of the chemical activator destabilizes the alkaline nanosilica dispersion to produce a solid gel lost circulation material. The solid gel lost circulation material forms from network structures. The alkaline nanosilica dispersion may be stable at a pH between about 8 to about 12. The stability of the alkaline nanosilica dispersion is due to silica particle repulsion resulting from surface ionization in the alkaline solution. The electrical repulsion between the same charged particles stabilizes the dispersion. Disturbance of the charge balance by reducing the pH to less than the gel pH due to the addition of acid can cause the alkaline nanosilica dispersion to destabilize and aggregate, which results in the formation of the solid gel lost circulation material.

The alkaline nanosilica dispersion within the nanosilica drilling fluid may be selected to obtain a gel pH compatible with the downhole conditions of the lost circulation zone and the gel time or rate of gel formation of the alkaline nanosilica dispersion. Specifically, a nanosilica dispersion may be selected such that the convertible drilling mud may be conveyed to the lost circulation zone before the downhole conditions result in completion of the formation of the solid gel lost circulation material from the convertible drilling mud. In various embodiments, the gel pH may be less than 8, less than 7, less than 6, or less than 5.

The ratio between the alkaline nanosilica dispersion and the chemical activator in the convertible drilling mud may be between 0.1 percent by volume (activator) of the total volume (nanosilica) (v/v %) to 10 v/v %. The weight ratio between the alkaline nanosilica dispersion and the chemical activator in the convertible drilling mud may alternatively be defined as between 1 to 0.001 and 1 to 0.25. The amount of chemical activator added to the alkaline nanosilica dispersion may be adjusted based on the change in pH required in the nanosilica drilling fluid. A greater required pH change correlates to a greater v/v % or ratio of chemical activator added to the alkaline nanosilica dispersion to generate a greater volume of acid for pH adjustment.

The gel time determines the working period to position the convertible drilling mud into the lost circulation zone after mixing of the chemical activator and the nanosilica drilling fluid. Specifically, introduction of the chemical activator into the nanosilica drilling fluid results in a virtually instantaneous adjustment of the pH of the resulting convertible drilling mud to less than the gel pH leaving only the time for actual solid gel formation to achieve the desired placement within the lost circulation zone. In one or more embodiments, the gel time may range between 5 minutes and 24 hours. In various further embodiments, the gel time may range between 30 minutes and 20 hours, 1 hour and 18 hours, 2 hours and 15 hours, and 10 minutes to 10 hours. It will be appreciated that the gel time may be tuned to account for the wellbore conditions at the depth at which the lost circulation zone is located.

It will be appreciated that the downhole temperature may have an effect on the gel time of the alkaline nanosilica dispersion in the convertible drilling fluid. Specifically, it is believed that as the surrounding temperature increases the gel time decreases. Further, it is believed that as the surrounding pressure increases the gel time decreases. Specifically, an electrical repulsion between the same charged particles stabilizes the alkaline nanosilica dispersion and avoids gel formation. Disturbance of the charge balance, by changing the pH for example, can cause the colloidal particles to aggregate and initiate formation of a gel. Increased pressure may increase the rate of aggregation of the silica particles resulting in a decrease in the gel time. As such, the temperature and pressure at the lost circulation zone must be accounted for when preparing the convertible drilling fluid formulation and the volume of chemical activator to utilize.

The solid gel lost circulation material is an irreversible solid gel. The solid gel lost circulation material does not degrade under temperature, pressure or pH conditions once formed. Gel breakers do not break the solid gel lost circulation material either.

As indicated, the nanosilica drilling fluid may include drilling fluid additives including viscosifiers, pH control agents, weighting agents, filtration control additives, and combinations of the same.

In one or more embodiments, the additive included in the nanosilica drilling fluid may be an alkali metal silicate or alkaline earth metal silicate. Examples of alkali metal silicates which may be included in the nanosilica drilling fluid include sodium silicate and potassium silicate. Examples of alkaline earth metal silicates which may be included in the nanosilica drilling fluid include magnesium silicate and calcium silicate. It will be appreciated that the addition of alkaline earth metal silicates may increase the compressive strength of the lost circulation material. In various embodiments, the alkali metal silicate or alkaline earth metal silicate may be present in the nanosilica drilling fluid at 1 to 40 wt. %.

In one or more embodiments, the additive included in the nanosilica drilling fluid may be a urea-formaldehyde resin. The urea-formaldehyde resins may be present in powder or liquid form within the nanosilica drilling fluid. It will be appreciated that the addition of urea-formaldehyde resins may increase the compressive strength of the loss circulation material. In various embodiments, the In various embodiments, the alkali metal silicate or alkaline earth metal silicate may be present in the nanosilica drilling fluid at 1 to 40 wt. %. may be present in the nanosilica drilling fluid at 1 to 40 wt. %.

The nanosilica drilling fluid may optionally include one or more alkaline compounds for pH adjustment, which may include lime (calcium hydroxide or calcium oxide), soda ash (sodium carbonate), sodium hydroxide (caustic soda), potassium hydroxide, or combinations thereof. It is noted that conjugate bases to acids with a pKa of more than about 13 are considered strong bases. The pH may be maintained within a range in order to minimize corrosion caused by the drilling fluid on steel tubulars, tanks, pumps, and other equipment contacting the drilling fluid as well as to maintain the pH greater than the gel pH prior to introduction of the chemical activator. Additionally, the alkaline compounds may react with gases, such as CO2 or H2S, encountered by the drilling fluid during drilling operations to prevent the gases from hydrolyzing one or more components of the drilling fluid. Some example drilling fluid compositions may optionally include from 0.1 pounds per barrel (lb/bbl) to 10 lb/bbl of alkaline compounds. In some embodiments, the drilling fluid compositions includes from 0.1 lb/bbl to 10 lb/bbl of caustic soda, 0.1 lb/bbl to 1lb/bbl of caustic soda, or 0.1 lb/bbl to 0.5 lb/bbl of caustic soda.

In embodiments, the nanosilica drilling fluid may include a rheology modifier, for example, a viscosifier, to impart non-Newtonian fluid rheology to the nanosilica drilling fluid to facilitate lifting and conveying rock cuttings to the surface of the wellbore and to suspend any weighting material.

Examples of viscosifiers may include, but are not limited to, xanthan gum polymer (XC polymer), bentonite, polyacrylamide, polyanionic cellulose, or combinations of these viscosifiers. In some embodiments, the nanosilica drilling fluid may include xanthan gum polymer, which is a polysaccharide secreted by the bacteria *Xanthomonas Campestris* (XC). An example nanosilica drilling fluid may include from 0.1 lb/bbl to 10 lb/bbl of XC polymer, 0.5 lb/bbl to 5 lb/bbl of XC polymer, or 1 lb/bbl to 3 lb/bbl of XC polymer. In another example nanosilica drilling fluid, bentonite may be added to the drilling fluid in an amount from 0.1 lb/bbl to 10 lb/bbl of bentonite, 1 lb/bbl to 8 lb/bbl of bentonite, or 3 lb/bbl to 5 lb/bbl of bentonite. Other suitable viscosifiers may be used in the nanosilica drilling fluid without deviating from the scope of the present subject matter.

In one or more embodiments, filtration control additive may be added to the nanosilica drilling fluid to reduce the amount of filtrate lost from the nanosilica drilling fluid into a subsurface formation. Examples of filtration control additives include organophilic (for example, amine-treated) lignite, bentonite, manufactured polymers, biopolymers, natural polymers, and thinners or deflocculants. In one or more embodiments the filtration control additive may be a polyanionic celluclose such as PAC-R™ which is commercially available from Halliburton Energy Services, Inc. The filtration control additive may also be a starch. The nanosilica drilling fluid may include from 1 lb/bbl to 10 lb/bbl of filtration control additive, from 2 lb/bbl to 8 lb/bbl of filtration control additive, from 3 lb/bbl to 7 lb/bbl of filtration control additive, or from 4 lb/bbl to 5 lb/bbl of filtration control additive.

In further embodiments, additives in the nanosilica drilling fluid may include a weighting material. The weighting material has a density suited for raising the drilling fluid composition density. In some embodiments, the weighting material may be a particulate solid having a density sufficient to increase the density of the drilling fluid composition without adding excessive weighting material such that the nanosilica drilling fluid cannot be circulated through the wellbore. The weighting material may have a density of from 2 grams per cubic centimeter ($g/cm^3$) to 6 $g/cm^3$. Examples of weighting materials include barite (minimum density of 4.20 $g/cm^3$), hematite (minimum density of 5.05 $g/cm^3$), calcium carbonate (minimum density of 2.7-2.8 $g/cm^3$), siderite (minimum density of 3.8 $g/cm^3$), ilmenite (minimum density of 4.6 $g/cm^3$), or any combination of these weighting materials. Some example nanosilica drilling fluid may include barite as the solid. It will be appreciated that the weight percent of the weighting material in the nanosilica drilling fluid may be 0 to 99 wt. % based on the total weight of the nanosilica drilling fluid to achieve an amount of weighting material sufficient to acquire a particular desired density.

In one or more embodiments, the nanosilica drilling fluid may comprise a yield point of 8 pounds per 100 square feet ($lb/100\ ft^2$) to 30 $lb/100\ ft^2$. In one or more further embodiments, the nanosilica drilling fluid may comprise a yield point of 10 $lb/100\ ft^2$ to 30 $lb/100\ ft^2$.

In at least one embodiment of the method for controlling loss circulation, the nanosilica drilling fluid may be utilized to drill a wellbore in a subterranean formation. When a lost circulation zone is encountered, the chemical activator may be mixed with the nanosilica drilling fluid to create the convertible drilling mud. It will be appreciated that the chemical activator can be introduced into the nanosilica drilling fluid while maintaining continuous flow of the nanosilica drilling fluid. The amount of chemical activator introduced into the nanosilica drilling fluid may be adjusted to achieve a desired gel time.

In one or more embodiments, the nanosilica drilling fluid and the chemical activator are combined at the surface of the wellbore and provided downhole as a single convertible drilling mud. Specifically, the chemical activator may be introduced into the nanosilica drilling fluid to form the convertible drilling mud prior to introduction into the wellbore. During passage from the surface to the lost circulation zone, acid in the chemical activator reduces the pH of the convertible drilling mud and begins the process of converting the convertible drilling mud to the solid gel lost circulation material. The acid reduces the pH of the convertible drilling mud as the convertible drilling mud circulates to the lost circulation zone. In some embodiments, the pH of the convertible drilling mud is reduced to less than the gel pH prior to positioning in the lost circulation zone resulting in initial formation of the solid gel lost circulation material. In further embodiments, the solid gel lost circulation material may begin to form subsequent to positioning in the lost circulation zone as the pH of the convertible drilling mud is not reduced to less than the gel pH prior to positioning of the convertible drilling mud within the lost circulation zone. The solid gel lost circulation material fills the lost circulation zone or passageways leading to the lost circulation zone to cease lost circulation and prevent further drainage of the microsilica drilling fluid.

In one or more embodiments, the nanosilica drilling fluid and the chemical activator are provided downhole as separate process streams. Specifically, the chemical activator and the nanosilica drilling fluid may be separately introduced into the wellbore, but combined to form the convertible drilling mud prior to introduction into the lost circulation zone. Providing the nanosilica drilling fluid and the chemical downhole as separate process streams may be achieved by pumping the nanosilica drilling fluid through the annulus of the drill string while the chemical activator may be pumped through the drill pipe. It will be appreciated that the nanosilica drilling fluid may instead be pumped through the drill pipe and the chemical activator may instead be pumped through the annulus. As such, conversion of the convertible drilling mud into the solid gel lost circulation material is initiated prior to introduction into the lost circulation zone. Similarly, to embodiments in which the convertible drilling mud is formed prior to introduction into the wellbore, the convertible drilling mud can circulate through the wellbore and channels within the subterranean formation to the lost circulation zone positioned downstream of the mixing point of the nanosilica drilling fluid and chemical activator. As the convertible drilling mud circulates through the wellbore and channels within the subterranean formation toward the lost circulation zone, the acid in the chemical activator reduces the pH of the convertible drilling mud. Providing the constituents of the convertible drilling mud downhole separately allows for positioning at a closer position to the lost circulation zone before initiating the gelling process with the acid of the chemical activator. As with embodiments in which the convertible drilling mud is formed prior to introduction into the wellbore, the pH of the convertible drilling mud may reduced to less than the gel pH prior to positioning in the lost circulation zone or subsequent to positioning in the lost circulation zone. Upon formation, the solid gel lost circulation material fills the lost circulation zone or passageways leading to the lost circulation zone to cease lost circulation and prevent further drainage of the microsilica drilling fluid.

The location of conversion to the solid gel lost circulation material may be determined based on calculations involving the volume of the nanosilica drilling fluid, the pump rate, and the distance between the lost circulation zone and the surface or mixing point of the nanosilica drilling fluid and chemical activator. Further, it will be appreciated that when the convertible drilling mud reaches the lost circulation zone, circulation can be temporarily terminated so as to allow the convertible drilling mud to gel in the lost circulation zone.

In one or more embodiments, when a lost circulation zone is encountered, a pill of the convertible drilling mud is produced by mixing the nanosilica drilling fluid and the chemical activator. The introduction of the nanosilica drilling fluid may be temporarily suspended with introduction of the convertible drilling mud pill into the wellbore. The pill of the convertible drilling mud may be allowed to migrate to the lost circulation zone. The pill of the convertible drilling mud may be followed by a slug or pill of the nanosilica drilling fluid. The volume of the pill of the convertible drilling mud may be based on the size of the lost circulation zone. It will be appreciated that the size of the lost circulation zone may be estimated based on the volume of lost drilling fluid. Further, the amount of chemical activator may be based on the desired gel time. As the pill of the convertible drilling mud migrates to the lost circulation zone, the nanosilica dispersion in the nanosilica drilling fluid undergoes the conversion to a gelled solid. The solid gel lost circulation material fills the lost circulation zone. Advantageously, the chemical activator and the alkaline nanosilica dispersion do not precipitate from the aqueous based drilling mud, which allows for the convertible drilling mud to be introduced to the wellbore as a single pill.

In one or more embodiments, the chemical activator may be combined with the nanosilia drilling fluid within the lost circulation zone. Upon encountering a lost circulation zone with the nanosilica drilling fluid, the nanosilica drilling fluid will naturally flood the lost circulation zone. A slug or pill of the chemical activator may be provided to the lost circulation zone to form the convertible drilling mud within the lost circulation zone. It will be appreciated that when the slug or pill of the chemical activator reaches the lost circulation zone and mixes with the nanosilica drilling fluid to form the convertible drilling mud, drilling and introduction of further drilling fluid can be temporarily terminated so as to allow the convertible drilling mud to gel in the lost circulation zone.

Nanosilica Drilling Fluid Composition

A nanosilica drilling fluid was prepared as a 74.8 pounds per cubic foot (pcf) nanosilica drilling fluid representing Example 1. To prepare the nanosilica drilling fluid, four lb/bbl of bentonite was prehydrated in 142.8 lb/bbl water for 16 hours and then mixed for 20 minutes (min). Additives were then added to the water/bentonite mixture according to the order and formulation listed in Table 1 to form the nanosilica drilling fluid.

TABLE 1

Formulation of nanosilica drilling fluid in Example 1.

| Component | Mixing time (min) | Amount (lb/bbl) |
|---|---|---|
| Water | — | 142.8 |
| Bentonite | 20 | 4 |
| XC polymer (biopolymer viscosifier) | 5 | 2 |
| Pre-gelatinized corn starch (filtration control additive) | 5 | 4 |
| PAC-R ™ (filtration control | 5 | 0.5 |

TABLE 1-continued

Formulation of nanosilica drilling fluid in Example 1.

| Component | Mixing time (min) | Amount (lb/bbl) |
|---|---|---|
| additive) | | |
| Caustic soda (pH control agent) | 5 | 0.25 |
| Alkaline nanosilica dispersion | 5 | 265.81 |

For purposes of preparing Example 1, the alkaline nanosilica dispersion was obtained commercially as IDISIL® SI 4545 from Evonik Industries (Essen, Germany); the properties are set forth in Table 2. The PAC-R™ was obtained commercially from Halliburton (Houston, Tex.).

TABLE 2

Properties of alkaline nanosilica dispersion

| Property | Value |
|---|---|
| Particle size - Titrated (nm) | 45 |
| Percent (%) $SiO_2$ | 45 |
| pH @ 25 degrees Celsius (° C.) | 9-11 |
| Density (g/cm$^3$) | 1.32 |
| Viscosity @ 25° C. (centipoise (cP)) | 30 |
| Visual Appearance | white/off-white |

For determination of the rheological and filtration properties of Example 1, the 74.8 pcf nanosilica drilling fluid (Example 1) was initially hot rolled for 16 hours at 200° F. (93.33° C.) in an aging cell. After hot rolling for 16 hours, the nanosilica drilling fluid was allowed to cool in the aging cell and then was transferred from the aging cell to a mud cup. The nanosilica drilling fluid was then mixed for about 5 min in the mud cup after which rheological and filtration properties were measured. The rheological properties were measured using a Fann 35 rheometer. The rheological measurements before hot rolling and after hot rolling are shown in Table 3.

TABLE 3

Rheological and filtration properties of the 74.8 pcf nanocilica drilling fluid of Example 1

| Rheology at 120° F. | Before Hot Rolling (BHR) | After Hot Rolling (AHR) |
|---|---|---|
| 600 revolutions per minute (rpm) | 95 | 62 |
| 300 rpm | 74 | 42 |
| 200 rpm | 63 | 32 |
| 100 rpm | 49 | 21 |
| 6 rpm | 22 | 4 |
| 3 rpm | 18 | 2 |
| Plastic viscosity (cP) | 21 | 20 |
| Yield point (lb/100 ft$^2$) | 53 | 22 |
| 10 sec. Gel Strength (lb/100 ft$^2$) | 21 | 5 |
| 10 min. Gel Strength (lb/100 ft$^2$) | 26 | 12 |
| pH | 9.35 | 9.04 |
| API fluid loss, 30 min (ml) | | 5 |

The nanosilica drilling fluid after hot rolling was demonstrated as stable. The nanosilica drilling fluid of Example 1 had a yield point value of 22 lb/ft$^2$ and an API fluid loss, 30 min, of 5 ml after hot rolling. A drilling fluid having a yield point between 10 and 30 lb/100 ft$^2$ is considered to be acceptable for industrial application. If the yield point is less than 10 the drilling fluid may not have sufficient cuttings carrying capacity, which may result in a stuck pipe. Additionally, for fluids having a density greater than 120 pcf in which barite is used as the weighting agent, the fluid may not have the capacity to suspend barite resulting in barite sag. Further, a drilling fluid having an API fluid loss, 30 min, of less than 10 ml is considered to be acceptable for industrial application. An elevated API fluid loss equates to greater drilling fluid being lost to the formation, requiring a greater amount of drilling fluid to drill the well.

Convertible Drilling Mud

A convertible drilling mud was prepared representing Example 2. To prepare the convertible drilling mud, 5 grams (g) of chemical activator was added to 350 ml of the nanosilica drilling fluid prepared as Example 1 in a mud cup. The specific chemical activator used was citric acid. The citric acid and nanosilica drilling fluid were mixed for 5 minutes using a multimixer. The convertible drilling mud was then static aged in a vertical position at 250° F. (121.11° C.) and 1000 pounds per square inch (psi) for 1 hour. After 1 hour of static aging, the convertible drilling mud was converted to the solid gel lost circulation material as shown in FIG. 1.

It should be understood that the various aspects of the convertible drilling mud and the method for producing a solid gel lost circulation material using the same are described and such aspects may be utilized in conjunction with various other aspects.

In a first aspect, the disclosure provides a method for controlling loss circulation in a subterranean formation. The method comprises a step of circulating in a wellbore a nanosilica drilling fluid having a pH in a range of from about 8 to about 11 and a gel pH of less than 8, the nanosilica drilling fluid comprising an aqueous-based drilling mud, an alkaline nanosilica dispersion, and at least one additive. The method also comprises introducing into the nanosilica drilling fluid an amount of a chemical activator sufficient to produce a convertible drilling mud, where the chemical activator is an acid and where the pH of the convertible drilling mud is less than the gel pH. The method further comprises allowing the convertible drilling mud to convert into the solid gel lost circulation material.

In a second aspect, the disclosure provides the method of the first aspect, in which the introduction of the chemical activator occurs upon the wellbore fluidly contacting a lost circulation zone.

In a third aspect, the disclosure provides the method of the second aspect, in which the chemical activator is introduced directly into the lost circulation zone such that the solid gel lost circulation material forms in the lost circulation zone.

In a fourth aspect, the disclosure provides the method of the second aspect, in which the chemical activator is introduced into the wellbore such that the solid gel lost circulation material forms in the wellbore and the method further comprises the step of circulating the solid gel lost circulation material into the lost circulation zone.

In a fifth aspect, the disclosure provides the method of the second aspect, in which the chemical activator is introduced into the wellbore such that the convertible drilling mud forms in the wellbore and the method further comprises the step of circulating the convertible drilling mud into the lost circulation zone such that the solid gel lost circulation material forms in the lost circulation zone.

In a sixth aspect, the disclosure provides the method of any of the first through fifth aspects, in which the chemical activator comprises an organic acid.

In a seventh aspect, the disclosure provides the method of any of the first through sixth aspects, in which the chemical activator is selected from the group consisting of lactic acid, citric acid, maleic acid, formic acid, acetic acid, and combinations thereof.

In an eighth aspect, the disclosure provides the method of any of the first through fifth aspects, in which the chemical activator comprises a mineral acid.

In a ninth aspect, the disclosure provides the method of any of the first through fifth or eighth aspects, in which the chemical activator is selected from the group consisting of hydrochloric acid, sulfuric acid, nitric acid, phosphoric acid, and combinations thereof.

In a tenth aspect, the disclosure provides the method of any of the first through ninth aspects, in which the amount of the chemical activator introduced into the nanosilica drilling fluid is operable to maintain a volume ratio of the chemical activator to the alkaline nanosilica dispersion of between 1:1000 and 1:10 before conversion occurs.

In an eleventh aspect, the disclosure provides the method of any of the first through tenth aspects, in which the gel pH is less than 6.

In a twelfth aspect, the disclosure provides the method of the eleventh aspect, in which the chemical activator is operable to reduce the pH of the convertible drilling mud to less than 6.

In a thirteenth aspect, the disclosure provides the method of any of the first through twelfth aspects, in which a gel time is between 5 minutes and 24 hours.

In a fourteenth aspect, the disclosure provides the method of any of the first through thirteenth aspects, in which the additive comprises an alkali metal silicate or alkaline earth metal silicate.

In a fifteenth aspect, the disclosure provides the method of any of the first through thirteenth aspects, in which the additive comprises a urea-formaldehyde resin.

In a sixteenth aspect, the disclosure provides a convertible drilling mud operable to convert into a solid gel lost circulation material. The convertible drilling mud comprises a nanosilica drilling fluid and a chemical activator. The nanosilica drilling fluid comprises an aqueous based drilling mud, an alkaline nanosilica dispersion, and at least one additive, where the nanosilica drilling fluid has a pH and a gel pH, and where the pH of the nanosilica drilling fluid is greater than the gel pH. The chemical activator comprises an acid that is operable to react with the nanosilica drilling fluid such that the solid gel lost circulation material forms, where the chemical activator has a pH less than 7. Further, the volume ratio of the chemical activator to the alkaline nanosilica dispersion is between 1:1000 and 1:10 before conversion of the convertible drilling mud into the solid gel lost circulation material.

In a seventeenth aspect, the disclosure provides the convertible drilling mud of the sixteenth aspect, in which the chemical activator comprises an organic acid.

In an eighteenth aspect, the disclosure provides the convertible drilling mud of the seventeenth aspect, in which the chemical activator is selected from the group consisting of lactic acid, citric acid, maleic acid, formic acid, acetic acid, and combinations thereof.

In a nineteenth aspect, the disclosure provides the convertible drilling mud of the sixteenth aspect, in which the chemical activator comprises a mineral acid.

In a twentieth aspect, the disclosure provides the convertible drilling mud of the nineteenth aspect, in which the chemical activator is selected from the group consisting of hydrochloric acid, sulfuric acid, nitric acid, phosphoric acid, and combinations thereof.

In a twenty-first aspect, the disclosure provides the convertible drilling mud of any of the sixteenth through twentieth aspects, in which the nanosilica drilling fluid has a pH between 8 and 11.

In a twenty-second aspect, the disclosure provides the convertible drilling mud of any of the sixteenth through twenty first aspects, in which the gel pH is greater than 3 but less than 8.

In a twenty-third aspect, the disclosure provides the convertible drilling mud of any of the sixteenth through twenty-second aspects, in which the chemical activator has a pH of less than 6.

In a twenty-fourth aspect, the disclosure provides the convertible drilling mud of any of the sixteenth through twenty-third aspects, in which the additive comprises an alkali metal silicate or alkaline earth metal silicate.

In a twenty-fifth aspect, the disclosure provides the convertible drilling mud of any of the sixteenth through twenty-third aspects, in which the additive comprises a urea-formaldehyde resin.

In a twenty-sixth aspect, the disclosure provides the convertible drilling mud of any of the sixteenth through twenty-fifth aspects, in which the nanosilica drilling fluid has a yield point of 8 lb/100 ft$^2$ to 30 lb/100 ft$^2$.

It should be apparent to those skilled in the art that various modifications and variations can be made to the embodiments described throughout the present disclosure without departing from the spirit and scope of the claimed subject matter. Thus it is intended that the specification cover the modifications and variations of the various embodiments described throughout the present disclosure, provided such modifications and variations come within the scope of the appended claims and their equivalents.

The various elements described can be used in combination with all other elements described herein unless otherwise indicated.

The singular forms "a", "an" and "the" include plural referents, unless the context clearly dictates otherwise.

"Optional" or "optionally" means that the subsequently described event or circumstances may or may not occur. The description includes instances where the event or circumstance occurs and instances where it does not occur.

Ranges may be expressed herein as from about one particular value to about another particular value and are inclusive unless otherwise indicated. When such a range is expressed, it is to be understood that another embodiment is from the one particular value to the other particular value, along with all combinations within said range.

As used herein and in the appended claims, the words "comprise," "has," and "include" and all grammatical variations thereof are each intended to have an open, non-limiting meaning that does not exclude additional elements or steps.

What is claimed is:

1. A method for controlling lost circulation in a subterranean formation, the method comprising the steps of:
    circulating in a wellbore a nanosilica drilling fluid having a pH in a range of from about 8 to about 11 and a gel pH of less than 8, the nanosilica drilling fluid comprising an aqueous-based drilling mud, an alkaline nanosilica dispersion, and at least one additive;
    introducing into the nanosilica drilling fluid an amount of a chemical activator sufficient to produce a convertible drilling mud, where the chemical activator is an acid and where the pH of the convertible drilling mud is less than the gel pH; and
    allowing the convertible drilling mud to convert into a solid gel lost circulation material.

2. The method of claim 1, where the additive comprises an alkali metal silicate or alkaline earth metal silicate.

3. The method of claim 1, where the additive comprises a urea-formaldehyde resin.

4. The method of claim 1, where the introduction of the chemical activator occurs upon the wellbore fluidly contacting a lost circulation zone.

5. The method of claim 4, where the chemical activator is introduced directly into the lost circulation zone such that the solid gel lost circulation material forms in the lost circulation zone.

6. The method of claim 4, where the chemical activator is introduced into the wellbore such that the solid gel lost circulation material forms in the wellbore; and
where the method further comprises the step of circulating the solid gel lost circulation material into the lost circulation zone.

7. The method of claim 4, where the chemical activator is introduced into the wellbore such that the convertible drilling mud forms in the wellbore; and
where the method further comprises the step of circulating the convertible drilling mud into the lost circulation zone such that the solid gel lost circulation material forms in the lost circulation zone.

8. The method of claim 1, where the chemical activator comprises an organic acid.

9. The method of claim 1, where the chemical activator comprises a mineral acid.

10. The method of claim 1, where the amount of the chemical activator introduced into the nanosilica drilling fluid is operable to maintain a volume ratio of the chemical activator to the alkaline nanosilica dispersion of between 1:1000 and 1:10 before conversion occurs.

11. The method of claim 1, where the gel pH is less than 6.

12. The method of claim 11, where the chemical activator is operable to reduce the pH of the convertible drilling mud to less than 6.

13. A convertible drilling mud operable to convert into a solid gel lost circulation material, the convertible drilling mud comprising:
a nanosilica drilling fluid, the nanosilica drilling fluid comprising:
an aqueous based drilling mud;
an alkaline nanosilica dispersion, where the nanosilica drilling fluid has a pH and a gel pH, and where the pH of the nanosilica drilling fluid is greater than the gel pH; and
at least one additive; and
a chemical activator, the chemical activator comprising:
an acid that is operable to react with the nanosilica drilling fluid such that the solid gel lost circulation material forms,
where the chemical activator has a pH less than 7; and
where the volume ratio of the chemical activator to the alkaline nanosilica dispersion is between 1:1000 and 1:10 before conversion of the convertible drilling mud into the solid gel lost circulation material.

14. The convertible drilling mud of claim 13, where the additive comprises an alkali metal silicate or alkaline earth metal silicate.

15. The convertible drilling mud of claim 13, where the additive comprises a urea-formaldehyde resin.

16. The convertible drilling mud of claim 13, where the chemical activator comprises an organic acid.

17. The convertible drilling mud of claim 13, where the chemical activator comprises a mineral acid.

18. The convertible drilling mud of claim 13, where the nanosilica drilling fluid has a pH between 8 and 11.

19. The convertible drilling mud of claim 13, where the gel pH is greater than 3 but less than 8.

20. The convertible drilling mud of claim 13, where the chemical activator has a pH of less than 6.

21. The convertible drilling mud of claim 13, where the nanosilica drilling fluid has a yield point of 8 lb/100 ft$^2$ to 30 lb/100 ft$^2$.

* * * * *